A. J. DREMEL.
WASHING MACHINE.
APPLICATION FILED FEB. 11, 1918.

1,417,306. Patented May 23, 1922.
7 SHEETS—SHEET 7.

Witness:
John Enders
Frederick F. Mason

Inventor:
Albert J. Dremel
by Walter R. Lane Atty.

UNITED STATES PATENT OFFICE.

ALBERT J. DREMEL, OF NEWTON, IOWA, ASSIGNOR TO THE MAYTAG COMPANY OF NEWTON, IOWA, A CORPORATION OF IOWA.

WASHING MACHINE.

1,417,306.  Specification of Letters Patent.  Patented May 23, 1922.

Application filed February 11, 1918. Serial No. 216,436.

*To all whom it may concern:*

Be it known that I, ALBERT J. DREMEL, a citizen of the United States, residing at Newton, in the county of Jasper and State of Iowa, have invented certain new and useful Improvements in Washing Machines, of which the following is a specification.

This invention relates to washing machines, and more particularly to those of the cylinder type with a wringer attached.

Among the objects of my invention is to produce a washing machine possessing the maximum of efficiency, silence, safety, convenience, simplicity, durability, and ease of operation, and having its parts so located that they can be quickly manipulated with no danger of catching the clothing or endangering the hands of the operator, or of soiling or tearing the clothes that are being washed; further to provide a novel washing cylinder in which the clothes are not only effectively rubbed but are subjected to a rapid flowing of the water thereagainst, whereby they may be more thoroughly cleansed; further to provide a wringer having an instant release in which the clothes can be quickly released in case any article becomes entwined around the rollers or clogged therebetween; further to provide a wringer which by a simple movement can be tilted to accommodate wringing in either direction, and which tilting movement will automatically carry the drain board into proper position; further to provide an adjustment to permit the wringer to be horizontally swung into any one of a plurality of adjusted positions; further to provide a novel form of cabinet for housing the cylinder and its mechanism, and arranged to automatically wipe all water from the under side of the cover in withdrawing the same; further to eliminate all wood in the construction; further to form the cylinder of aluminum whereby it will be substantially non-corrosive and of maximum sanitary value; further to reduce to the minimum the number of controlling levers; further to provide a machine which will not only effectively wash heavy clothing but will also handle the most delicate laces or the finest white clothes with even less danger of tearing and soiling than when washing by hand; further to provide means for preventing the clothes from becoming bunched together in the washing cylinder; further to eliminate excessive shock when throwing the cylinder operating mechanism into operation; further to provide a novel means for draining the tank; and such further objects, advantages and capabilities as will later appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 6 is a vertical sectional view showing the end of the cylinder and the gearing for operating the same.

Fig. 6$^a$ is a detail view of the construction shown in the upper left-hand corner of Fig. 6.

Fig. 7 is a fragmentary vertical section through the wringer gearing and mechanism for operating the cylinder.

Figure 1:
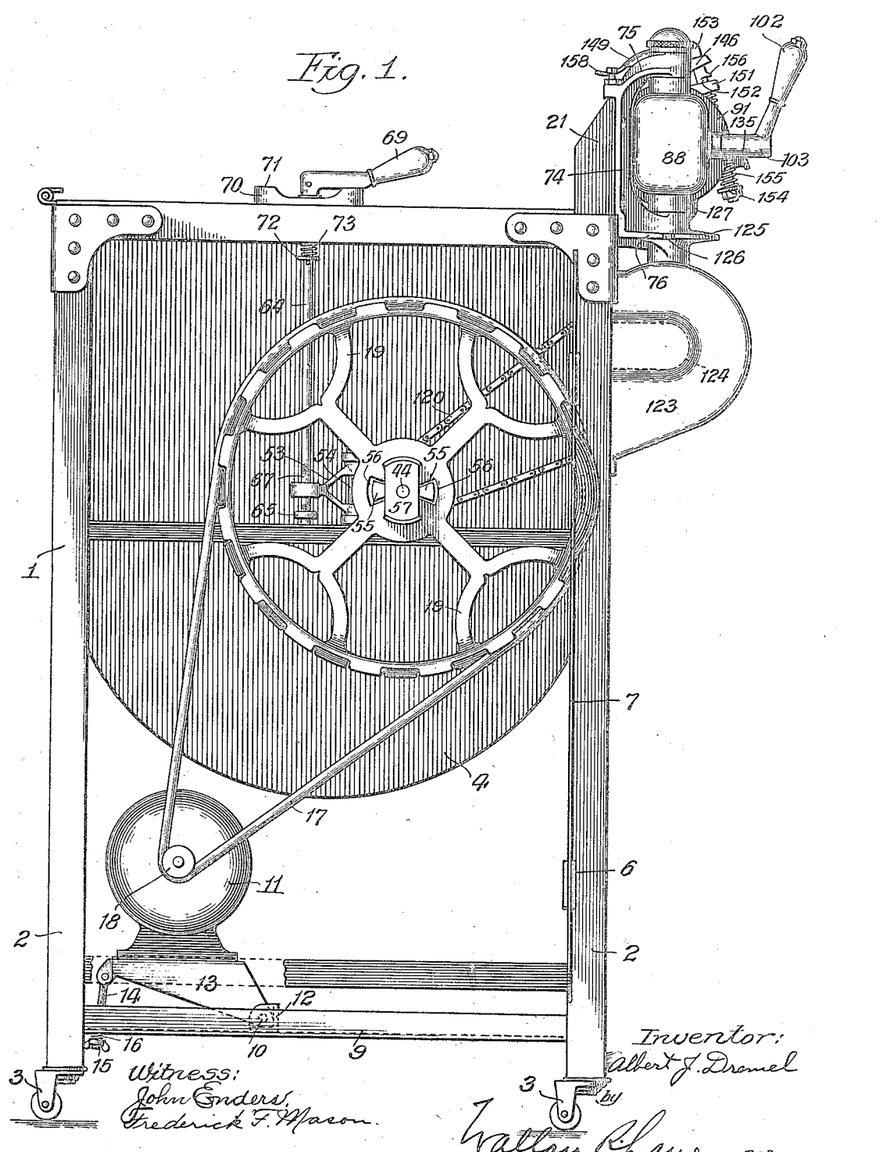
Fig. 1 is an end elevation of a washing machine embodying my invention, and having the swinging door standing open at an angle of ninety degrees in order to show the driving mechanism.
Figure 4:
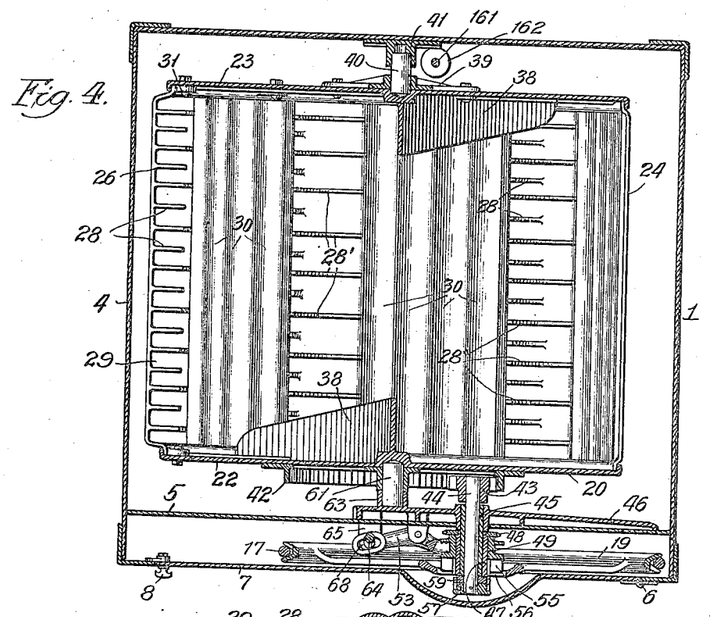
Fig. 4 is a horizontal transverse sectional view taken on a plane passing through the center of the cylinder.

Referring to the drawings, my improved washing machine comprises the upright frame or stand 1, having the legs 2, upon the bottom of which are suitably secured caster rollers 3. This frame is constructed entirely of metal and has secured therein the tank 4, extending vertically in which tank and adjacent one end is the partition 5. Suitably hinged at 6, as shown in Figs. 1 and 4, is the swinging door 7, this door being shown standing open at ninety degrees in Fig. 1 and closed in Fig. 4. Suitable means 8 may be provided for securing the door in closed position. Extending between the legs 2 and near the bottom thereof are the cross beams 9 upon which is suitably pivoted at 10, upon the cross pieces 12, the motor 11. The base 13 of the motor has pivotally connected at its forward end the downwardly extending rod 14, which projects through one of the cross members and is provided on its lower end with the wing nut 15, between which wing nut and the cross member is a coil spring 16 to resiliently hold the motor against excessive upward movement. This arrangement enables the weight of the motor and its parts, in conjunction with the tension of the spring 16, to act as a tightening means for the belt 17, which runs over the motor pulley 18, and the large drive wheel 19, which drive wheel is in turn suitably connected for rotating the washing cylinder 20 journaled within the tank 4. Located upon the upper corner of the tank frame is the bracket 21, upon which is mounted the wringer to be hereinafter described.

The machine is provided with a cover, 4ª, having at the forward and rear edges thereof rolls, 4ᵇ, the forward one of which is provided with a rod, 4ᶜ, the extending ends of which engage hooks, 4ᵈ, at opposite sides of the machine, so that when the cover is shoved backwardly and allowed to hang at the back of the machine, these extending ends will support said cover from the hooks, 4ᵈ. Overlapping the top of the machine and extending downwardly at the back side thereof is a wiper strip, 4ᵉ, which is clamped between the top of the machine and the band, 4ᶠ, so that the same may be held in position to wipe the under side of the cover 4ª, as the cover is shoved backwardly. This wipes all the surplus water from the under side of the cover and prevents the same from dripping on the floor.

Figure 5:
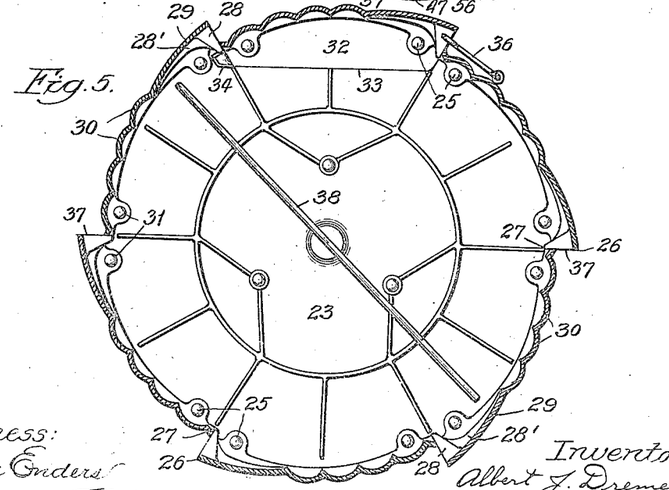
Fig. 5 is a vertical sectional view through the cylinder.
Figures 6, 6A, 7:
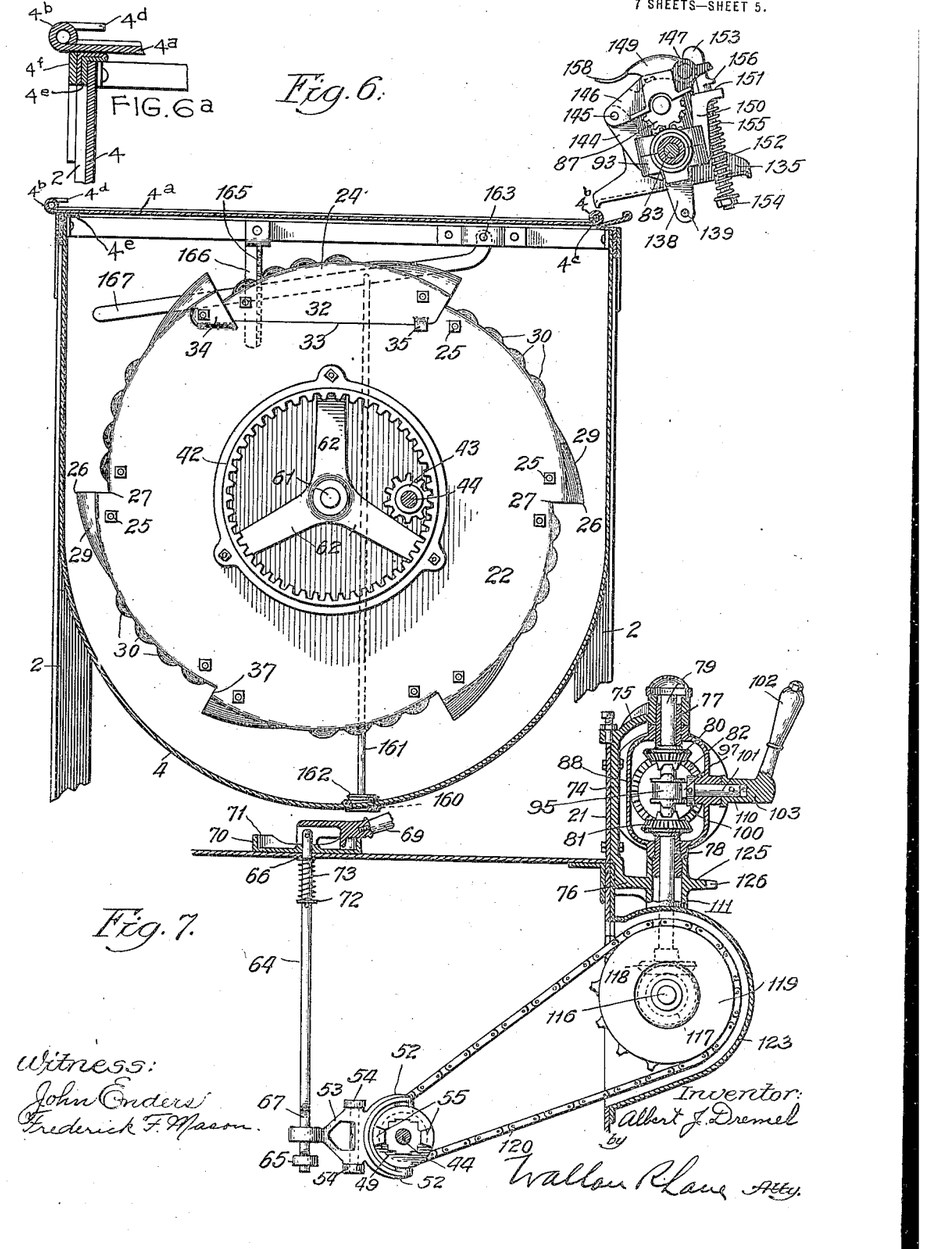

The cylinder 20 comprises the spaced end plates 22 and 23, the configuration of which is best seen in Fig. 6. Secured between the marginal edges of these end plates are the circumferential washing plates 24, of which there are six in number. These plates, as will be seen in Fig. 6, are secured to the end plates by means of suitable bolts 25 or similar fastening means, and each has its forward edge 26 radially spaced from the rear edge 27 of the next preceding plate. These plates are provided at their forward edges 26 with a series of inwardly extending teeth 28, as best seen in Fig. 4, and which teeth extend perpendicularly from the body of the plate across the space just described. This forward portion of the plates 24 is of outwardly extended scoop formation 29, as clearly seen in Figs. 4 and 5. The result of this scoop formation is that upon rotation of the cylinder within the tank, the water will be forced through these spaces and between the teeth 28 into the interior of the cylinder. The plates 24 are also corrugated along their rear portions at right angles to their direction of travel, as shown at 30 (see Figs. 3, 4, 5 and 6.) Within the scoop portions are the rearwardly extending ribs 28' as best seen in Figs. 4 and 5. The water as it enters between the teeth 28 and through the scoop portion of the plates will be forced against the clothes, which, as the cylinder rotates, will be rubbed against the corrugations 30. These corrugations have a tendency to carry the clothes upwardly for a short distance after which they will slide downwardly thereover thus producing a wash board effect. At the ends of each of the plates 24 are formed the lugs 31, by means of which these plates are secured to the marginal portions of the plates 22 and 23 by the bolts 25 referred to above. One of the plates is so formed and arranged that it may be easily and quickly removed or replaced in order to serve as a door for the cylinder. This specially formed plate is best seen in Fig. 6, at 24', and has formed upon each end thereof the downwardly extending flanges 32, which are adapted to fit into the cutaway portions 33 of the end plates. The flanges 32 are shaped at their rear corners to fit snugly into the outwardly pressed sockets 34 formed in the end plates, while at their forward corners they are provided with the downwardly extending lugs 35 adapted to fit over the outside of the edge of the cutaway portion 33 to prevent any lateral shifting of these plates. The rear corners of this plate 24' by fitting into the sockets 34 hold the rear edge of this plate securely in position, while the front edge is detachably secured in position by means of a suitable hook 36, or other similar device, and which hook when it is desired to remove this cover plate can be quickly unlatched to permit the removal of the plate. An inspection of Fig. 6 will show that the end plates 22 and 23 do not have their marginal portions in the form of a true circle, but at six equally spaced positions around the circumference, the curvature is such as to fall inside of the margin of a major circle, so as to provide offsets 37, which serve to give the proper inclination to the plates 24, and also to increase the space between the forward edge of these plates and the rear edge of the next preceding plate.

Each of the end plates has formed integrally therewith and on their inside face, a diametrically extending rib 38, and in assembling these end plates they are so positioned that these ribs will fall in planes at right angles to each other, the purpose for which is to break up the rolling of the clothes during the rotation of the cylinder by continually throwing them up sideways, and thus preventing them from becoming bunched or too tightly packed together. By placing these ribs at right angles to each other, this breaking up of the bunching of the clothes is accomplished to a far greater degree than would be possible, were the ribs placed parallel to each other.

Figure 3:
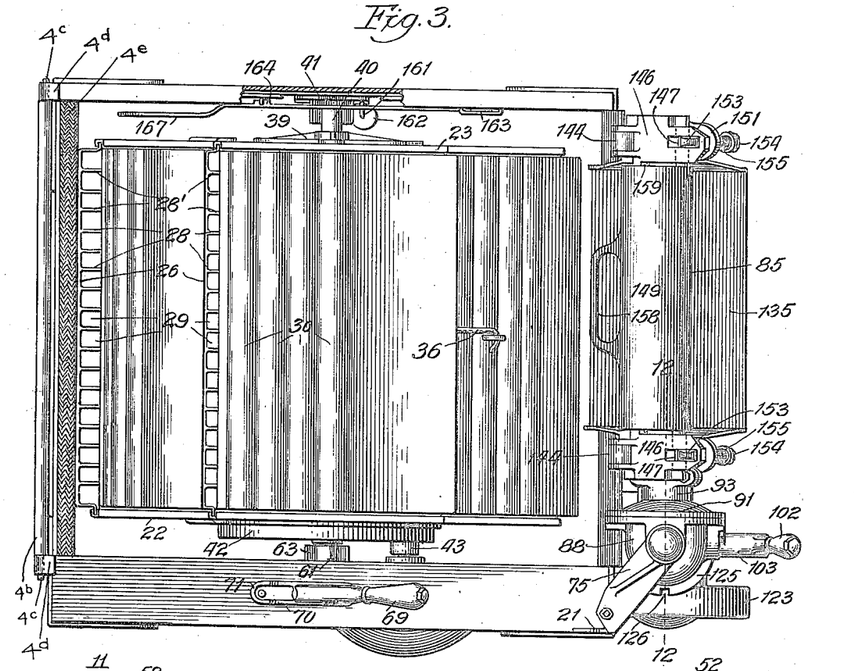
Fig. 3 is a top plan view with the tank cover in its open position.
Figures 8, 9, 10, 11:
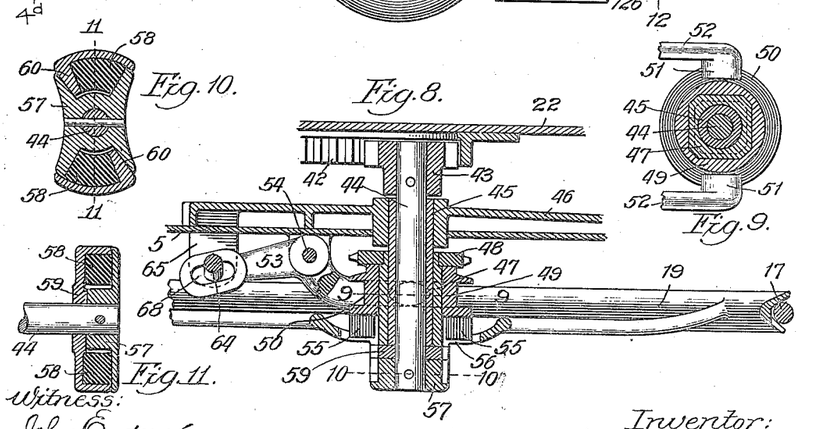
Fig. 8 is a fragmentary horizontal section taken through the cylinder operating mechanism.
Fig. 9 is a vertical section taken on the line 9—9 of Fig. 8.
Fig. 10 is a vertical section taken on the line 10—10 of Fig. 8.
Fig. 11 is a fragmentary vertical section taken on the line 11—11 of Fig. 10.

Secured upon one end of the cylinder is the spider 39, within which is fixed the journal 40 for rotation in the bearing 41, which bearing is open at its upper side to permit the removal of the journal in an upwardly direction therefrom. Secured upon the opposite end of the cylinder and to the end plate 22 is the annular gear 42, meshing with which is the pinion 43 mounted upon the shaft 44, journaled in the sleeve 45 mounted in the bearing bracket 46, which bracket is suitably secured to the partition 5. Mounted upon the sleeve 45 and adjacent the outer end thereof is the sleeve 47, which is formed integrally with the drive wheel 19 to rotate therewith. This sleeve 47 has fixed upon its inner end the sprocket wheel 48, and also has slidably mounted thereon the sliding clutch 49; the cross section of the sleeve 47 and of the opening in the clutch 49 being substantially square whereby to cause these parts to rotate together, and yet permit free longitudinal movement therebetween. The clutch 49 is provided around its circumference with the groove 50, in which groove and at diametrically opposite points, slidably fit the projections 51 of the arms 52 carried by the lever 53, which lever is pivoted at 54. The clutch 49 is formed on its outer end with suitable clutch teeth or projections 55, which are adapted to slide through openings 56 in the hub of the drive wheel 19. Keyed to the outer end of the shaft 44 is the recessed plate 57, which is shown in cross section in Figs. 10 and 11, and in the recesses of which are mounted the resilient pads 58. Just back of this recessed plate 57 and loosely mounted upon the shaft 44 is the flanged plate 59, the flanges 60 of which are adapted to also enter the recesses of the recess plate, so that the resilient pads 58 will lie between one of these flanges and the opposide wall of the recessed plate. Upon suitable movement of the lever 53, the clutch 49 will be caused to slide outwardly through the opening 56 in the drive wheel and the clutch tooth 55 caused to come into engagement with each of the concave sides of the flanged plate 59, and when this clutch 49 is rotated by the drive wheel 19, it will when it comes into engagement, also cause the plate 59 to rotate carrying with it the plate 57. As will be seen from an inspection of Fig. 10, when plate 59 is caused to rotate, the flange 60 will at once compress the resilient pad 58 between this flange and the opposite wall of the recess in the plate 57, thus effectively absorbing the shock that would be otherwise placed upon these parts by suddenly throwing the cylinder into rotation, which rotation, as will be seen by Fig. 8, is transmitted from the plate 57 through the shaft 44 and pinion 43 to the annular gear 42 secured upon the end of the cylinder. It may here be noted that the cylinder is rotatably mounted at its driving end by means of the stub shaft 61 secured in the hub of the arms 62, which arms are formed integrally with the annular gear 42. The stub shaft 61 at its outer end is rotatably mounted in the bearing 63 formed integrally with the gearing bracket 46, which bearing is also open towards the upper side as shown in Fig. 3 to permit this stub shaft to be removed upwardly therefrom in a manner similar to that of stub shaft 40 at the opposite end of the cylinder, thus permitting the cylinder to be vertically removed from the tank.

As a means for operating the lever 53 to throw the clutch into or out of engagement, I have provided the vertical shaft 64 journaled at its lower end in the bracket 65, and at its upper end in the bearing 66 formed in the upper part of the frame. At a point slightly above the bearing 65, the rod 64 is formed with the crank 67, which as shown engages the slot 68 in the free end of the lever 53. Pin-connected to the upper end of the shaft 64 is the handle 69, and underneath this handle for engagement therewith is located upon the top of the frame, the bearing plate 70, the opposite ends of which are provided with the raised portions 71, upon one of which the handle rests when in position to cause the cylinder to rotate, and upon the other of which it rests when the mechanism for rotating the cylinder is thrown out of engagement. Encircling the upper shaft 64 and secured between the collar 72 and the under side of the frame is the coil spring 73, the function of which is to exert a downward thrust on the shaft 64 to thus hold the handle 69 suitably in the desired position. It will be apparent that upon rotation of the handle 69, the lever 53 will be correspondingly moved and the clutch 49 operated to cause the pinion 43 to drive the annular gear 42 or not as desired.

Figures 12, 13, 14:
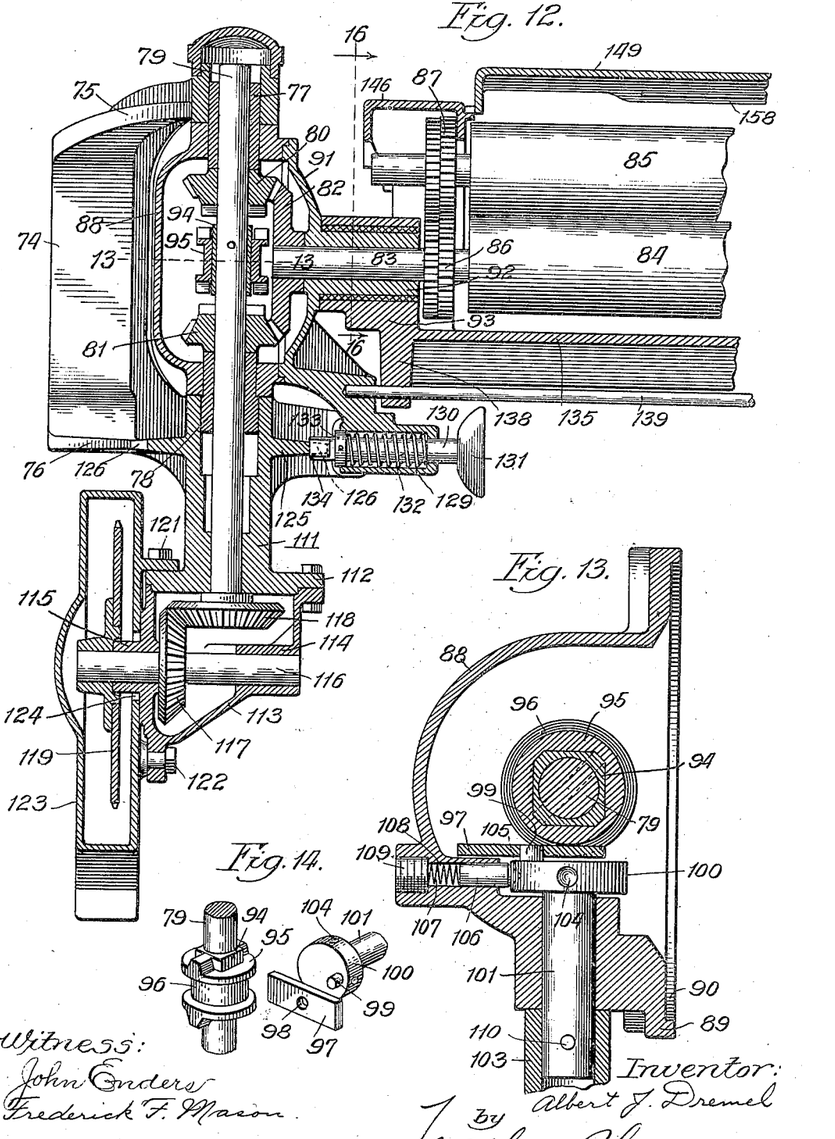
Fig. 12 is a vertical section through the wringer gearing taken on the line 12—12 of Fig. 3.
Fig. 13 is a horizontal section through the wringer operating clutch mechanism, taken on the line 13—13 of Fig. 12.
Fig. 14 is a view showing the wringer clutch, the sliding plate and the operating disc in position ready to be assembled.

Suitably bolted to the bracket 21 is a second bracket 74 comprising the upper arm 75 and the lower arm 76, each of which arms is provided with suitable bearings for the sleeves 77 and 78 respectively, and in which sleeves are in turn journaled the vertical shaft 79, loosely mounted upon which are the bevelled gears 80 and 81, which in turn mesh with the bevelled gear 82 fixed upon the shaft 83, which shaft carries the lower roller 84 of the wringer. The roller 84 is rotatably geared with the upper roll 85 through the medium of the gears 86 and 87. Rotatably mounted upon the sleeves 77 and 78 and between the arms 75 and 76 is the gear housing 88, which as seen in Fig. 13 is provided with the flat front face 89, which is recessed at 90, and to which face fits the cover plate 91, which has integrally formed therewith the outwardly extending sleeve 92, upon which is journaled the bearing 93 of the main portion of the wringer frame whereby the wringer is rotatably mounted upon the sleeve 92, as best shown in Fig. 12.

The means for reversing the direction of rotation of the wringer rolls comprise the sleeve 94 (see Fig. 13) which is keyed to the shaft 79 and the exterior surface of which is substantially square in cross section. Slidably mounted upon this sleeve 94 is the clutch 95, which is provided with the circumferential groove 96, within which fits the plate 97, which is provided with the opening 98, within which opening is adapted to fit the pin 99 which is eccentrically carried by the disc 100. This disc is fixed upon the end of the shaft 101 to rotate therewith when this shaft is rotated by a suitable manipulation of the handle 102 mounted upon the sleeve 103. From this construction, it will be seen that by throwing the handle 102 to one side or the other, the shaft 101 will be correspondingly rotated, which in turn rotates the disc 100, causing the plate 97 to be elevated or lowered, thus elevating or lowering the sliding clutch 95, the ends of which are suitably formed to engage corresponding clutch surfaces in the gears 80 and 81. These gears being located on diametrically opposite sides of the gear 82 will, as is obvious, cause the same to rotate in one direction or the other, in accordance with which of the gears 80 or 81 is being driven by the clutch 95.

In order to lock the clutch 95 in elevated or lowered position, I have provided the disc 100 with a plurality of openings 104, within any one of which may engage the tapered end 105 of the pin 106, which pin is resiliently held in engagement in said openings by the coil spring 107 mounted in the opening 108 and held between the end of the pin 106 and the inner surface of the plug 109. This as will be apparent is sufficient to hold these parts against any ordinary pressure or jar and yet will permit these parts to be moved upon sufficient pressure being exerted upon the handle 102. It will be noted that the shaft 101 is fixed to the sleeve 103 by means of the pin 110.

The lower arm 76 of the bracket 74 is extended downwardly to form the leg 111, which leg is suitably bored and in which is journaled the lower end of the shaft 79. This leg 111 is provided at its end with the flange 112, to which flange is suitably bolted the integral gear housing 113, which housing is provided at its opposite sides with the bearings 114 and 115, within which is journaled the shaft 116. Upon the shaft 116 is fixed the bevelled gear 117, which in turn meshes with the bevelled gear 118 fixed upon the lower end of the shaft 79. The shaft 116 projects a substantial distance beyond the end of the bearing 115 and has fixed thereupon the sprocket wheel 119, which sprocket wheel is in alignment with the sprocket wheel 48 described above, and over which two sprocket wheels runs the sprocket chain 120, by means of which rotation is transmitted from the drive shaft 44 to the shaft 116, and in turn to the wringer rolls 84 and 85. Suitably placed over the sprocket wheel 119 and bolted to the flange 112 by bolts 121 and to the integral housing 113 by bolts 122 is the housing 123, which is provided in its inner side with the slot 124, whereby the same may be slid in position over the bearing 115 preparatory to being bolted in place.

Figures 15, 16:
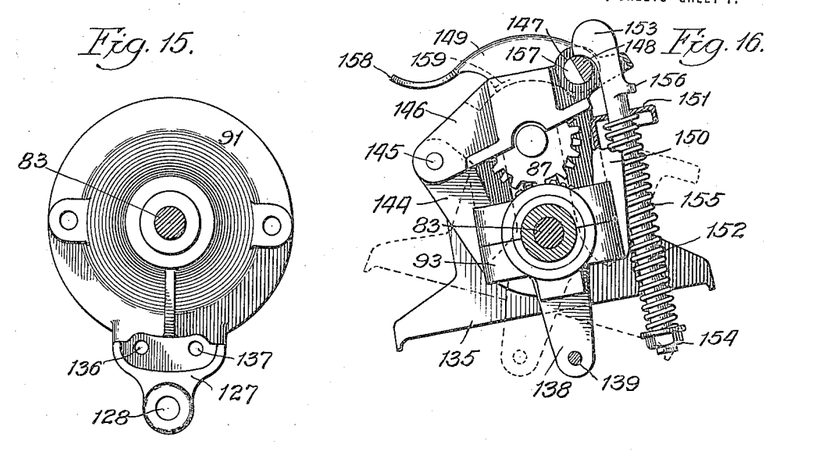
Fig. 15 is a side elevation of the wringer gearing cover.
Fig. 16 is a vertical section taken on the line 16—16 of Fig. 12 and looking in the direction of the arrows.

From the construction described above, it will be seen that the wringer is mounted for horizontal rotation upon the shaft 79 through the medium of the sleeves 77 and 78, and in order to permit the wringer to be locked in any one of a plurality of horizontal positions, the lower arm 76 of the bracket 74 is provided with a flange 125, which flange is in turn provided around its circumference with a plurality of notches 126. Extending downwardly from the cover plate 91 of the gear housing and as best seen in Fig. 15, is the projection 127, which projection is provided with the opening 128 in line with which is the cylindrical bore 129. Slidably mounted within the opening 128 is the stem 130, which carries upon its outer end the handle 131. Encircling this stem and located within the cylindrical bore 129 is the coil spring 132, which spring is suitably compressed between the closed end of the cylindrical bore and the collar 133 secured upon the stem 130, constantly impelling this stem inwardly, whereby its tapered end 134 may be brought into engagement with any one of the notches 126 desired, thus locking the wringer in any one of a plurality of horizontal positions, whereby the same may be made to wring clothes either directly from the tank, or from a separate rinsing tub, into a separate basket, or in any other position in which it is desired to operate the same. As will be obvious, the stem 130 can be pulled outwardly by pressure exerted upon the handle 131, whereby to release the end 134 from the notches 126 preparatory to rotating the wringer into a different position.

Figure 2:
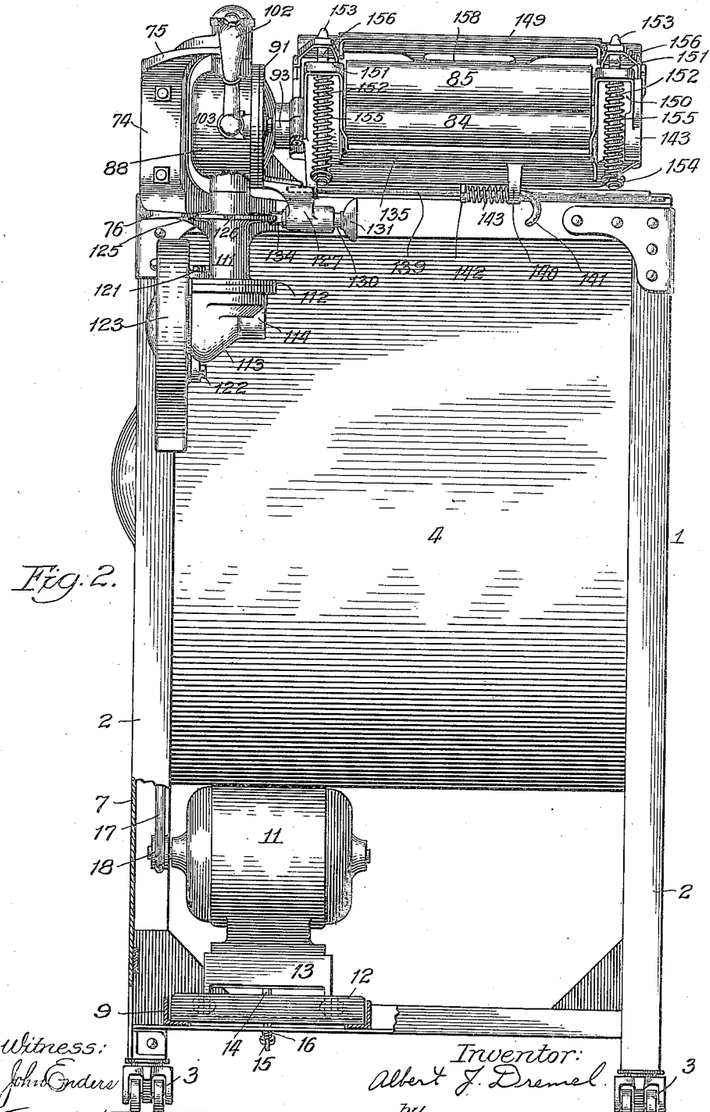
Fig. 2 is a side elevation at right angles to that shown in Fig. 1.

As stated above, the wringer is mounted for vertical rotation upon the sleeve 92, whereby the wringer frame and the drain board 135, which is secured thereto at the bottom, may be quickly and suitably tilted towards either side, whereby to accommodate wringing in either direction. In order to lock the wringer in the desired one of these tilted positions, I have provided a suitable locking means which I will now describe. As shown in Fig. 15, the projection 127 of the cover plate 91 is provided with the apertures 136 and 137, and the downwardly extending leg 138 of the wringer frame is also provided with an aperture which can be brought into registry with either one of the apertures 136 or 137 upon suitable rotation of the wringer upon the sleeve 92. Extending through the aperture in the leg 138 is the rod 139, which as shown in Fig. 2, extends at its outer end through the apertured projection 140. This rod is formed at its free end with a suitable handle 141, and at a point removed from the end with the collar 142. A coil spring 143 encircles the rod 139, and is compressed between the projection 140 and the collar 142, whereby to impel the rod 139 in a direction towards the left in Fig. 2. It will thus be seen that when the aperture in the leg 138 is brought into registry with either of the apertures 136 and 137 that the rod 139 under the action of the spring 143 will enter these apertures, and thus lock the wringer in the desired tilted position. The drain board 135 being secured to the wringer will at the same time that the wringer is tilted, be automatically thrown into proper position to accommodate wringing in the direction for which the wringer is tilted. These two positions of the wringer are indicated in Fig. 16, it being shown in full lines as tilted to one side, and in dotted lines as tilted to the opposite side.

Figure 17:
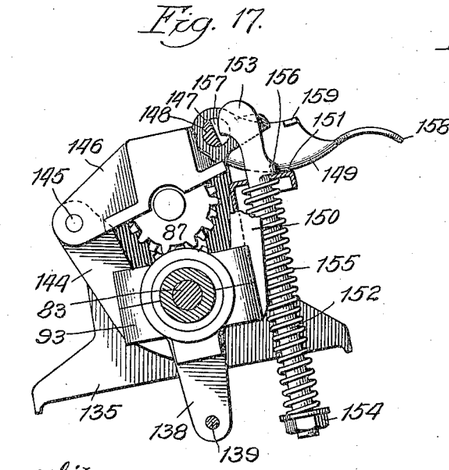
Fig. 17 is a view similar to Fig. 16, but showing the top guard plate swung forward just prior to raising the top roll and in position to unlock the same.
Figure 18:
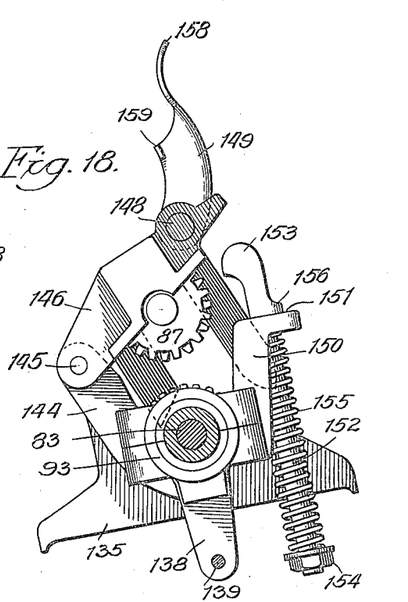
Fig. 18 is a view similar to Fig. 17, but showing the top roll in elevated position.

The wringer comprises the end bearing 93, which as explained above is rotatably mounted upon the sleeve 92, and at its opposite end is provided with the bearing 143, between which bearings are secured, or if desired, formed integrally therewith, the drain board 135. The lower roll 84 is journaled at one end in the sleeve 92 and at its opposite end in the bearing 143, and as explained above is in driving engagement with the upper roll 85 through the medium of the gears 86 and 87. Formed integrally with the lower bearing 93 is the upwardly extending arm 144, to which is pivotally connected at 145 the upper bearing 146, which at its forward end is provided with the opening 147, (see Fig. 3) there being one of these upper bearings for each end of the wringer. Rotatably connected with the upper bearings 146 by means of pins 148 passing through the openings 147 is the upper roll guard plate 149. Extending upwardly from the lower bearing 93 and on the side opposite from the arm 144 is the arm 150, which at its upper end is provided with the outwardly extending flange 151, through which flange slidably extends the rod 152, provided at its upper end with the hook 153, which hook is adapted to take over the pin 148. Encircling the rod 152 and confined between the flange 151 and head 154 is the coil spring 155, the function of which is to exert a continuous downward pressure upon the rod 152, which rod is provided near its upper end with the projection 156 for engagement with the upper side of the flange 151, whereby to limit this downward movement. There is provided a similar arrangement of bolt and hook at each end of the wringer, as shown in Fig. 2. The pin 148, as best shown in Fig. 16 is slotted at 157, the function of which slot is to cause the remaining portion of the pin to act as a cam surface, whereby as will be understood from an inspection of Fig. 16, a half rotation of pin 148 will release the hook 153 and allow the rod 152 to move downwardly under action of spring 155. This half rotation of pin 148 is effected by grasping the handle 158 of plate 149 and swinging the same through substantially one hundred and eighty degrees towards the front, thus in turn rotating pin 148 to release hooks 153 as explained above. Fig. 16 shows the plate 149 before being rotated. Fig. 17 shows this plate after being rotated approximately one hundred and eighty degrees to the front, and clearly illustrates the manner in which the hook 153 is released. Immediately upon this release of the hook, the upper bearings 146 may be swung upwardly carrying therewith the upper roll 85, thus providing a structure which can be quickly manipulated in order to release any bunched or entangled clothes between the rolls when such is necessary. As is apparent the upper bearings may be quickly and easily locked in operative position by a reverse operation of the parts just described. In order to hold the guard plate 149 in proper spaced relation from the upper roll, there is provided on this plate a lug 159 which comes in contact with a suitable bearing surface on the upper bearing in order to hold this plate in the desired position.

In order that the water may be quickly and easily drained from the tank, I have provided in the bottom thereof the opening 160. On the bottom of the vertically extending rod 161 there is secured the valve 162, which is adapted to tightly seat in the upper portion of the opening 160, whereby to prevent any water from passing therethrough until the valve is raised. In order that the valve may be raised to drain the tank, I have provided at the upper end of the rod 161 the lever handle 167, to which, as shown, the upper end of the rod 161 is pivotally connected. The handle 167 is suitably fulcrumed at 163 and is provided in its front portion with the short flange 164, which flange is adapted to engage with the teeth 165 of the rack 166 suitably secured to the side of the tank and adjacent the top thereof. As will be obvious by disengaging this flange from the teeth 165 and elevating the handle 167, the valve 162 will be raised away from the opening 160, and the water permitted to flow therethrough. In closing this valve, all that is necessary is to depress the handle 167 until the valve is closed and lock the flange 164 in engagement with the teeth 165, thus providing means whereby the handle will be firmly secured to hold the valve in closed position. There is sufficient resiliency in the handle 167 to insure the valve 162 being securely locked in closed position.

Having now described my invention, I claim:

1. In a washing machine a washing plate having its front edge in the form of a scoop, ribs in said scoop extending at right angles to and rearwardly from said front edge teeth adjacent said front edge, and the portion of said plate in the rear of said scoop being corrugated in a direction at right angles to said ribs.

2. In a washing machine, a washing cylinder comprising a plurality of circumferential plates, each plate at its forward edge being radially spaced from the rear edge of the next preceding plate, said forward edge being curved to form a scoop, and a plurality of ribs in said scoop, to reinforce the scoop and prevent bending thereof.

3. In a washing machine a washing cylinder comprising a pair of end plates, a plurality of circumferential plates secured between the marginal portions of said end plates whereby to leave an opening substantially of the size of one of said circumferential plates, and a separate circumferential plate removably fitted in said opening, the forward edge of each of said circumferential plates being scoop shaped and spaced from the rear edge of the next preceding plate with a plurality of teeth extending across said space, and a plurality of ribs extending rearwardly from the forward edge of each plate and transversely thereto, inside of said cylinder.

4. In a washing machine a tank, a lid on said tank, and means operable upon the opening of said lid for automatically removing excess moisture therefrom.

5. In a washing machine a tank, a lid slidably mounted on said tank, and means over which said lid slides in opening to wipe excess moisture therefrom.

6. In a washing machine a tank, a lid slidably mounted upon said tank and a wiping pad secured to said tank to contact with the underside of said lid during withdrawal whereby to automatically remove excess moisture from said lid in opening the same.

In witness whereof, I hereunto subscribe my name to this specification in the presence of two witnesses.

ALBERT J. DREMEL.

Witnesses:
E. H. MAYTAG,
F. MAYTAG.